Figure 1:
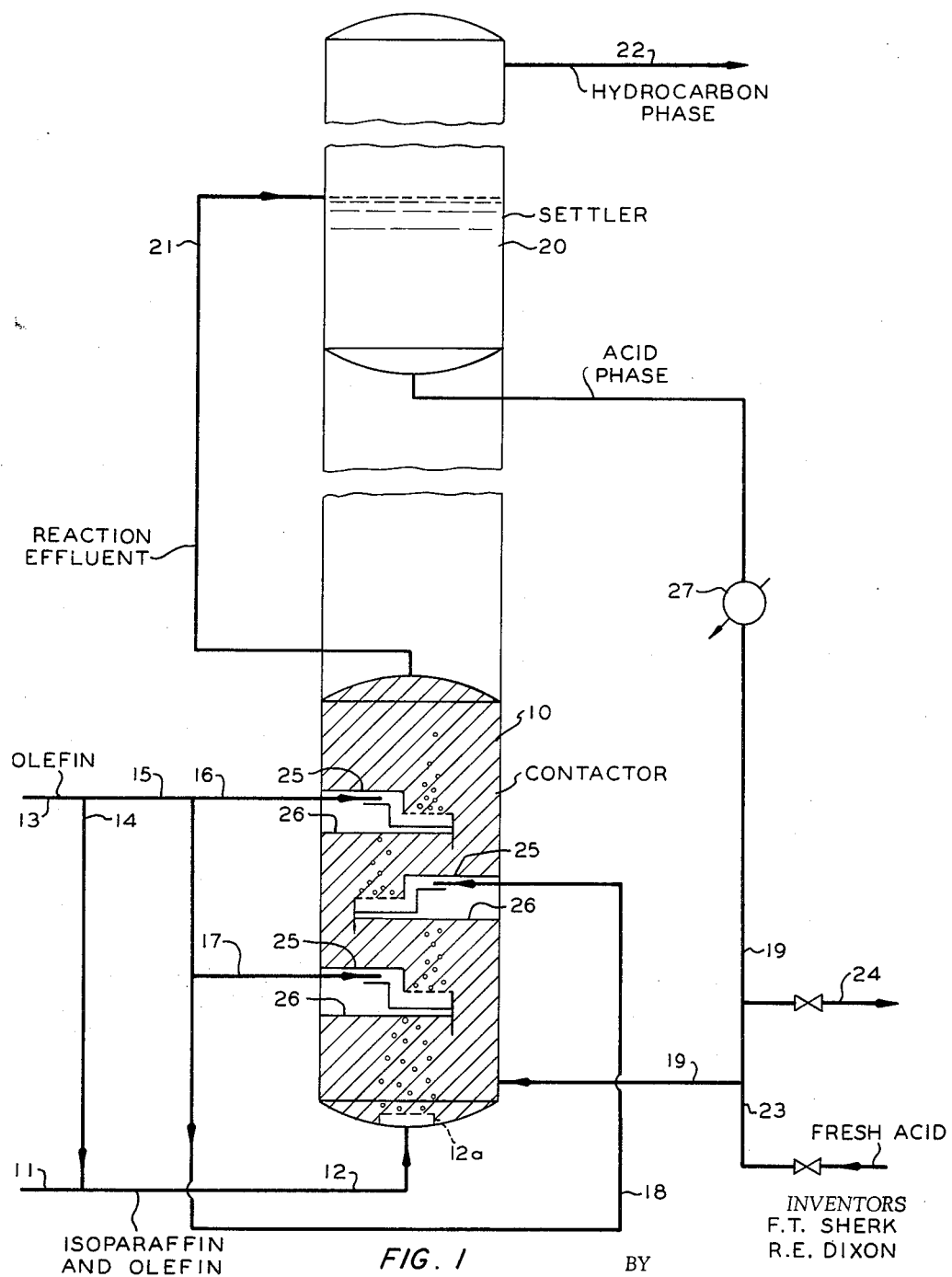

May 3, 1966  F. T. SHERK ETAL  3,249,649
CATALYTIC ALKYLATION

Filed Feb. 28, 1963  2 Sheets-Sheet 1

INVENTORS
F.T. SHERK
R.E. DIXON
BY
young & Quigg
ATTORNEYS

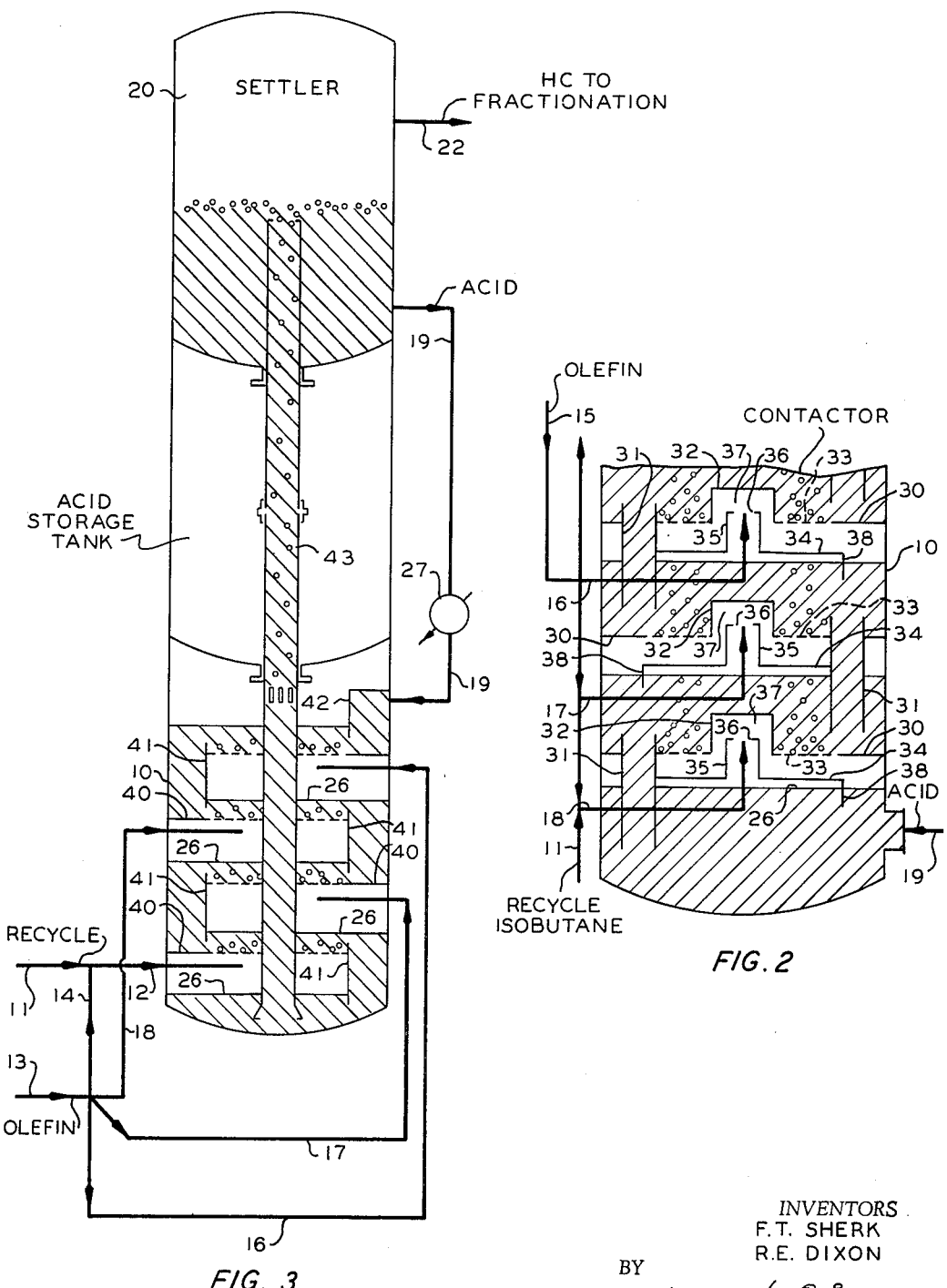

> United States Patent Office 3,249,649
Patented May 3, 1966

3,249,649
CATALYTIC ALKYLATION
Fred T. Sherk and Rolland E. Dixon, Bartlesville, Okla., assignors to Phillips Petroleum Company, a corporation of Delaware
Filed Feb. 28, 1963, Ser. No. 261,647
9 Claims. (Cl. 260—683.48)

This invention relates to reactions between hydrocarbon materials in the presence of a catalyst for the reaction. In accordance with one aspect, this invention relates to the akylation of a liquid alkylatable hydrocarbon with an alkylating agent in the presence of a liquid catalyst wherein a high ratio of alkylatable hydrocarbon to alkylating agent is achieved throughout the alkylation reaction zone. In accordance with a further aspect, this invention relates to novel apparatus for effecting the alkylation reaction of said alkylation process.

Many processes have been proposed for alkylating paraffins with olefins and other alkylating reactants, such as an alkyl halide, ether, alcohol, or the like, to produce normally liquid isoparaffins suitable for use in motor fuels. Several different types of reaction systems have been proposed. It is known in the alkylation art that the olefins are more reactive than the isoparaffins and in order to avoid the preferential polymerization reaction, or at least to reduce it to a minimum when alkylation is desired, various process and apparatus expedients have been employed in order to overcome this difficulty.

A desired end result of the system contemplated according to this invention is to produce greater yields of alkylation or other reaction products, which products will be substantially free from side reaction contaminating materials, by maintaining a high, but optimum, ratio of unreacted reactant paraffin to olefin throughout the reaction zone. This invention relates especially to means for reacting certain isoparaffin hydrocarbons with olefins to produce increased yields of branched chain paraffinic hydrocarbon boiling within the gasoline range, as in the alkylation of isobutane with butylene in the presence of hydrofluoric acid as a catalyst material. Although thus specifically applied, the invention contemplates the employment of any suitable hydrocarbon material including isobutane, isopentane, and other paraffin materials capable of chemical combination with olefins to obtain products of the character desired. The invention also contemplates the employment of any suitable catalyst material, in addition to hydrofluoric acid, such as mixtures of sulfuric and phosphoric acid, hydrofluoric acid and certain complexes of aluminum chloride and boron fluoride. Furthermore, the invention is intended for employment under the usual or conventional range of operating conditions of temperature and pressure.

Accordingly, an object of the present invention is to provide a system for carrying out catalytic reactions of the general character contemplated, and especially to provide means for alkylation of isoparaffins with olefins by means of which polymerization and other side reactions are reduced to a minimum with a resulting improvement in the yields and quality of desired products obtained.

It is a further object of the invention to provide means for reacting isoparaffins with olefins in the liquid phase under suitable conditions of temperature and pressure, and in the presence of an active acid catalyst material including hydrofluoric acid and any other material comparable to those previously mentioned.

Another object of the invention is to provide a system for alkylating isoparaffins with olefins in the presence of a liquid acid catalyst material in which the olefins are introduced in such fashion as to substantially prevent immediate contact of the olefins with the catalyst material to produce polymerization of the olefins to the exclusion of alkylation with isoparaffins.

A further object of the invention is to provide an improved means for contacting materials of the character contemplated one with the other for the purposes set forth.

Other objects and advantages of the invention will be apparent from the accompanying description and discussion.

Broadly, according to the invention, novel apparatus and process for catalytic alkylation are provided wherein the alkylation reaction is carried out in an elongated reaction zone and olefin is introduced into a separated hydrocarbon phase at a plurality of spaced points along the length of the reaction zone.

More specifically, the process comprises the steps of forming a reaction mixture comprising isoparaffin, olefin and acid catalyst, subjecting the reaction mixture to alkylation conditions in an elongated alkylation zone or contactor, effecting separation of a hydrocaron phase from the reaction mixture at a plurality of spaced points along the length of the reaction zone, introducing additional olefin into the separated hydrocarbon phases at said spaced points, and then dispersing the hydrocarbon mixture thus formed at said spaced points into the reaction mixture containing acid catalyst and continuing alkylation, thus maintaining a high ratio of isoparaffin to olefin throughout the length of the reaction zone, and recovering alkylate from said reaction zone, said ratio also being an optimum ratio of isoparaffin/olefin.

Further, according to the invention, a multi-section alkylation contactor is provided which comprises an elongated chamber having a plurality of spaced feed inlet distributors adapted to introduce olefin into a separated hydrocarbon phase at each spaced point and then introduce or disperse the resulting hydrocarbon mixture into the catalyst-containing phase to continue alkylation. Thus, according to the apparatus of the invention, a plurality of reaction sections are provided, each being adapted for passage of reactant hydrocarbons upwardly in subdivided form to a body of liquid acid catalyst. Each of the sections or distributors is in open communication with at least two other similar sections in order that catalyst can flow from section to section through the system, either upwardly or downwardly when a vertical contactor is employed, while hydrocarbons flow from section to section through the system and additional olefin is introduced into each section out of contact of the acid catalyst phase. Thus, the invention apparatus provides multi-stage means for effecting either concurrent or countercurrent contact between catalyst and hydrocarbons passing through the system while permitting separate control of conditions of reaction and concentration of reactants in each stage.

The invention and its objects can be more fully understood from the following description when read in conjunction with the accompanying drawings in which FIGURE 1 is a diagrammatic side elevational view of an apparatus suitable for accomplishment of the method according to the present invention, FIGURE 2 is an enlarged vertical section through another form of feed distributor means for initially contacting the hydrocarbon reactant and catalyst materials under the desired conditions according to the invention, and FIGURE 3 is a diagrammatic side elevational view of another apparatus suitable for accomplishment of the method according to the present invention.

Referring to the drawings in greater detail, numeral 10 designates a reaction vessel or contactor. This vessel can be of any suitable proportions as required by the volume of materials to be handled and by the residence time required for the reaction to be carried out therein. For example, in a typical alkylation reaction, the vessel 10 should be of such volume as to permit a residence time of the materials in the reactor vessel of from about 30 seconds to about 5 minutes. Disposed above contactor 10 and in vertical alignment therewith is settling chamber 20. Settler 20 can be of any suitable proportion as required by the volume of reaction effluent materials passed from contactor 10 to settler 20 wherein separation of a hydrocarbon phase and an acid catalyst phase is effected. Settler 20 can be provided with suitable baffling means or other means for assisting separation of the two phases. Although settler 20 is shown located above reactor 10 in FIGURES 1 and 3, it is within the scope of the invention to employ two vessels located at the same level or any other desired position to effect contacting of reactants and separation of reaction effluent. The use of mechanical means to transfer materials from one vessel to another would be necessary when using such arrangements where elevation differences are not adequate for gravity induced flow.

Referring to FIGURE 1, in particular, isoparaffin, e.g., isobutane from a source (not shown) is introduced into the system by way of line 11. Olefin, e.g., butylene, from a source (not shown), is introduced into the system by way of line 13. A portion of the olefin in line 13 is passed by way of line 14, to line 11 to provide an initial reaction mixture for introduction into contactor 10. A mixture of isoparafin and olefin at the desired ratio of components is introduced into a lower portion of contactor 10 by way of line 12 and distributor 12a. As shown in the drawing, distributor 12a is a perforated plate; however, other suitable means can be used. Acid catalyst, e.g., HF acid, is introduced into a lower portion of contactor 10 by way of line 19. The reaction mixture of isoparaffin, olefin and acid catalyst formed at the base of contactor 10 is subjected to alkylation conditions and reaction is effected between the hydrocarbon reactants. The reaction mixture is passed upwardly through contactor 10 toward outlet 21 in FIGURE 1.

According to the invention, contactor 10 is provided with a plurality of olefin feed inlet distributors 25 spaced along the length of contactor 10. The olefin feed distributors are preferably equally spaced although this is not necessary for operation of the invention. Feed inlet distributors 25, as shown in FIGURE 1, comprise an upper perforated plate extending from one side wall toward the opposite side wall of the contactor in combination with a lower second imperforate plate member connected to the perforated end of the upper plate and extending only part way across the contactor. A downwardly extending leg or plate member is provided on the perforated end of the feed distributor to provide a passageway or downcomer for movement of reaction mixture from one section of the contactor to the next. Also, the space under distributor 25 provides a separation section wherein a hydrocarbon phase separates out from the catalyst-containing reaction mixture passing upwardly through contactor 10. Olefin is introduced into contactor 10 at each feed inlet distributor 25 out of contact of catalyst into the hydrocarbon phase. Numeral 26 designates the interface between the hydrocarbon and acid containing phases. Olefin by way of lines 15, 16, 17 and 18 provide introduction of olefin into the hydrocarbon phase in the space between the two plates at each feed inlet distributor 25. The hydrocarbon phase separated out at each spaced point together with added fresh olefin is dispersed into the catalyst-containing reaction mixture above each distributor through the perforations in the top plate of distributor 25, thus providing a high ratio of isoparaffin to olefin throughout the length of contactor 10.

By the practice of the invention olefin is introduced at a plurality of spaced points along an elongated reaction zone with a mole ratio of reactant paraffin to alkylating olefin reactant of at least about 10 to about 1 or more at the inlet end of the reaction zone and with either successively higher or lower ratios or equal ratios of these reactants at subsequent points of addition of the alkylating reactant. Assuming an initial isobutane/olefin ratio of 10:1 in the feed inlet conduits 11 and 13, this ratio becomes much higher at all points of contact with catalyst in the reactor. A further highly important advantage of the invention lies in the fact that alkylation is carried out primarily at points at which there is a very high proportion of isoparaffin to olefin, a condition favorable to alkylation in that it tends to suppress undersirable side reactions such as polymerization.

A reaction effluent comprising alkylate, unreacted hydrocarbons, catalyst, etc., is withdrawn from the outlet end of contactor 10 by way of line 21 and passed to settler 20 wherein separation of a hydrocarbon phase and an acid phase is effected. The hydrocarbon phase is withdrawn from an upper portion of settler 20 by way of line 22 and passed to further processing as desired, for example, fractionation into various component parts. An acid catalyst phase is withdrawn from a lower portion of settler 20 and returned to contactor 10 through cooler 27 by way of line 19. As desired, a portion of the acid catalyst can be withdrawn from the system by way of valved line 24 and passed to an acid rerun unit for purification of acid catalyst. Acid catalyst from the rerun unit and/or fresh acid can be introduced into the system by way of valved line 23.

As shown in the embodiment described in connection with FIGURE 1, reactant hydrocarbons and acid catalyst pass concurrently through contactor 10. However, it is within the scope of the invention to introduce acid catalyst into an upper portion of contactor 10 with isoparaffin and olefin being introduced at the base and effect alkylation within contactor 10 under countercurrent contacting conditions. In such an operation, an acid-containing phase is withdrawn from the base of contactor 10 and a hydrocarbon phase from an upper portion of contactor 10. It is within the scope of the invention to use the hydrocarbon phase to assist elevation of the acid from the base of contactor 10 to settler 20, for example as shown in FIGURE 3.

As shown in FIGURE 1 the several vessels, namely contactor 10 and settler 20 are preferably disposed in vertically spaced relation to each other in order that flow of the catalyst can be induced by gravity although pumps can be used for this purpose. It is also within the scope of the invention to employ a third vessel (not shown) between settler 20 and contactor 10 for emptying settler 20 when desired.

Referring to FIGURE 2, another form of contactor 10 is shown wherein feed inlet distributors of different configuration are provided. Each of the feed inlet distributors is comprised of an upper perforated plate member 30 extending across contactor 10. Plate 30 is connected to the side walls of contactor 10 and is provided with a downcomer member 31 connecting one section of contactor 10 with the next adjacent section. Located on plate 30 is an upwardly extending domed or chimney-type portion 32, which provides a contacting section for introduced olefin by way of lines 16, 17 and 18. Surrounding dome 32 are perforations 33 on upper plate 30. Below plate 30, and preferably parallel thereto, is plate member 34 connected to downcomer 31 and the side walls of contactor 10. Located on plate 34 is a domed section 35 which is smaller than domed section 32 and which extends up part way into dome 32. Dome 35 is provided with an opening 36 to allow introduction of olefin and separated hydrocarbon into contacting section 37 between the two domes. One end of plate 34 is provided with a depending leg 38 short of one side wall to provide flow of separated hydrocarbon into contacting section 37. Downcomers 31 are positioned on opposite side walls of contactor 10 so as to provide a tortuous path for the reaction mixture flowing upwardly through contactor 10. Separated hydrocarbon and added olefin mixed therewith in contacting section 37 at each spaced point is dispersed into an acid-containing phase above each feed distributor by way of perforations 33.

In actual operation, isoparaffin is introduced into the system by way of line 11 and passed by way of line 18 along with some olefin into the lowermost feed inlet in contactor 10. Acid catalyst is also introduced by way of line 19 into the base of contactor 10. Additional olefin is introduced at each spaced feed point along the length of contactor 10 by way of lines 15, 16 and 17. Acid and hydrocarbons are removed from an upper portion of contactor 10 and passed to a suitable settling zone for effecting separation of a hydrocarbon phase and an acid phase for further use in the process.

An alternative embodiment is shown in FIGURE 3 wherein hydrocarbon feed comprising isoparaffin and olefin is introduced into a lower portion of contactor 10 by way of line 12 and acid catalyst is introduced into an upper portion of contactor 10 by way of line 19 and contacting of the hydrocarbons and acid is effected under countercurrent contacting conditions. Contactor 10 is provided with a plurality of spaced perforated trays 40 having downcomer legs 41 on alternate sides of the contactor. Each perforated tray 40 is preferably provided with a depending leg so as to form downcomer 41. Contactor 10 and settler 20 are preferably in vertical alignment.

Referring now to FIGURE 3, isobutane by way of line 11 and olefin, e.g., butylene, by way of line 13 are introduced into the system. Olefin is introduced into line 11 by line 14 so that a mixed feed of isoparaffin and olefin can be introduced into a lower portion of contactor 10 by way of line 12. Additional olefin is introduced at spaced points along contactor 10 into the hydrocarbon phase below each perforated plate 40 by way of lines 16, 17 and 18. Acid is introduced into an upper portion of contactor 10 by way of line 19. A deflector plate 42 is provided for directing the flow of acid in contactor 10 introduced by way of line 19. A lift pipe 43 extends preferably coaxially from a lower portion of contactor 10 into a lower portion of settler 20 and serves to elevate acid catalyst and some hydrocarbon from a lower portion of contactor 10 and hydrocarbon from an upper portion of contactor 10 to settler 20. Perforations are provided in lift pipe 43 in the upper portion of contactor 10 for dispersing hydrocarbon into the acid phase in lift pipe 43 so that the difference in densities in the two acid conduits 43 and 19 is effective for furnishing the energy required in elevating the effluent to settler 20. Separation of a hydrocarbon phase and an acid phase is effected in settler 20. The hydrocarbon phase is removed from an upper portion of settler 20 by way of line 22 and passed to fractionation for further separation. Acid catalyst is removed from a lower portion of settler 20 and passed by way of line 19 through cooler 27 to contactor 10. Acid catalyst can be removed from the system for rejuvenation and returned along with fresh acid catalyst as desired and needed.

Conventional alkylation conditions of temperature, pressure, time, isoparaffin-olefin ratios and acid catalyst-hydrocarbon ratios can be employed advantageously in the process and apparatus contemplated herein. For example, the alkylation of isobutane with butenes can be carried out at temperatures between about 0° F. and 150° F., preferably between about 40° F. and 140° F. at pressures at least sufficiently high to keep hydrocarbons and HF acid in the liquid phase, and with isobutane-butene ratios of between 2:1 and 100:1, preferably between about 10:1 to 50:1. Ratios of isobutane to butene of at least 2 to 1 are utilized since lower ratios tend to cause polymerization of the butenes with resultant decrease in yield of the alkylate product and/or excessive reaction between the butenes and the primary alkylate product because of the relatively low ratios of isobutene to alkylate product in the reaction mixture. The ratio of HF to hydrocarbon charge can be varied considerably, but most satisfactory results are obtained with an excess of HF. Ratios of HF to hydrocarbon on the contacting portion of the reactor olefin feed inlets of at least 2:1 are used, with a ratio of about at least 5:1 being preferred.

Although the foregoing description has been directed to alkylation of isobutane with butenes in the presence of hydrogen fluoride, it will be understood, of course, that the invention is applicable also to alkylation of other hydrocarbons in the presence of HF or other acid catalyst. By way of illustration, $C_7$ and $C_8$ alkylates can be prepared from isobutane and mixtures of propylene and butenes; so also, $C_9$ alkylates can be obtained by alkylation of isobutane with pentenes. As a further illustration of the process, cumene can be prepared herein by reaction of benzene with propylene. In general, then, the invention is suitable for alkylation of alkylatable hydrocarbons particularly low boiling isoparaffins, with alkylating agents, particularly low boiling olefins.

This invention is best illustrated by reference to the following specific embodiment.

SPECIFIC EXAMPLE

An alkylation reactor, settler and cooling system of the type illustrated in FIGURE 1 is employed for the alkylation of isobutane with butylenes in the presence of liquid HF acid. Contactor 10 is an upright vessel 9 feet in diameter and 8 feet long and is provided with three olefin feed inlet distributors 25 that are spaced 2 feet apart. Settler 20 is also an upright vessel 40 feet long and 9 feet in diameter.

Isobutane at a temperature of about 95° F. in line 11 is mixed with olefins at a temperature of about 100° F., introduced through line 14, and the mixture thus formed is introduced into the bottom of contactor 10 through feed atomizer into a body of HF acid. Additional olefin is added to the reaction mixture along the length of contactor 10 at the three feed distributors 25 by way of lines 16, 17 and 18. The total amount of olefin passed to the contactor is divided equally in lines 14, 16, 17 and 18. The isobutane to olefin ratio throughout the length of contactor is about 47:1.

The reaction effluent at a temperature of about 95° F. is removed from the top of contactor 10 and passed to settler 20 wherein phase separation is effected. The hydrocarbon phase is removed by line 22 and the acid phase by line 19. The acid phase is cooled from about 95° F. to about 91° F. by cooler 27 before reintroduction into contactor 10.

The composition of the various feed streams is shown below in the table.

TABLE

*Streams*

| Composition | (13) Olefin feed, b.p.s.d. | (11) Recycle isobutane, b.p.s.d. | (14, 16), (17, 18) Split olefin feed, b.p.s.d. | (12) First contact feed, b.p.s.d. | (19) Acid, b.p.s.d. | (22) B.p.s.d. | After first contact, b.p.s.d. |
|---|---|---|---|---|---|---|---|
| HF | | 1.2 | | 1.2 | 146,091.4 | 120.0 | 104.0 |
| $C_3H_6$ | 139.1 | | 39.8 | 39.8 | | | |
| $C_3H_8$ | 348.6 | 1,488.7 | 87.2 | 1,575.9 | 1,499.4 | 1,875.0 | 1,579.9 |
| $iC_4H_{10}$ | 1,739.3 | 13,065.7 | 434.8 | 13,500.5 | 5,613.0 | 13,685.9 | 13,116.5 |
| $C_4H_8$ | 999.7 | | 249.9 | 249.9 | | | |
| $nC_4H_{10}$ | 502.1 | 1,961.0 | 125.5 | 2,086.5 | 797.0 | 2,486.0 | 2,086.5 |
| $C_5H_{12}+$ | 63.4 | 225.1 | 15.8 | 240.9 | 494.4 | 2,305.8 | 753.9 |
| ASO | | | | | 6,612.2 | | |
| $H_2O$ | | | | | 3,164.4 | | |
| Total | 3,792.3 | 16,741.7 | 948.1 | 17,689.8 | 164,272.0 | 20,472.6 | 17,639.8 |

First Contact Ratio=46.55:1.
Second Contact Ratio=46.80:1.
Third Contact Ratio=47.05:1.
Fourth Contact Ratio=47.30:1.

One especially advantageous mode of alkylation employing multipointwise addition of olefin at successive spaced inlets along an elongated reaction zone, as set forth according to the invention, comprises correlating the rate of olefin introduction along the reaction zone at each particular olefin inlet in such a way that this rate is progressively decreased in the direction of flow in correspondence with the increase in the local concentration of products (caused by reaction of the olefin and isobutane in prior zones), whereby the ratio of isoparaffin to olefin increases as the concentration of products increases. Another advantage of the invention comprises the addition of additional olefin into a hydrocarbon phase to obtain an intimate mixture of reactants prior to contacting with acid catalyst and continuing alkylation, thus minimizing polymerization of olefins to the exclusion of alkylation isoparaffins with olefins. Thus, by the practice of the invention contact of olefin with the catalyst material in the absence of isoparaffins is avoided as are the undesirable secondary or side reactions.

The invention can be practiced otherwise than as specifically shown, and many variations and modifications of it will be apparent to those skilled in the art in view of the present disclosure and discussion.

We claim:

1. A process for catalytic alkylation which comprises:
   introducing as the reaction mixture, alkylatable material, alkylating agent and alkylation catalyst into one end of an elongated reaction zone,
   subjecting said reaction mixture to alkylation conditions in said zone,
   separating out a substantially catalyst free phase from said reaction mixture at a plurality of spaced points within said reaction zone,
   introducing alkylating agent into said separated phase out of contact of catalyst at each of said spaced points and then introducing the mixture thus formed into reaction mixture containing catalyst to effect further alkylation, thus maintaining a high ratio of alkylatable material to alkylating agent throughout the length of said reaction zone,
   removing a reaction effluent comprising alkylate, unreacted materials and catalyst from the other end of said reaction zone, and
   passing same to a settling zone, and
   separately recovering an alkylate phase and a catalyst phase from said settling zone.

2. A process for catalytic alkylation which comprises:
   introducing alkylatable material and alkylating agent into a lower portion of an upwardly extending elongated reaction zone,
   introducing alkylation catalyst into an upper portion of said reaction zone,
   countercurrently contacting catalyst and introduced hydrocarbon reactants under alkylation conditions in said zone to form an alkylate,
   separating out a substantially catalyst free hydrocarbon phase from the reaction mixture in said reaction zone at a plurality of spaced points within said reaction zone,
   introducing additional amounts of alkylating agent into the separated hydrocarbon phase at each of said spaced points, thus maintaining a high ratio of alkylatable material to alkylating agent throughout said reaction zone,
   dispersing said separated hydrocarbon phase and additional alkylating agent upwardly at each of said spaced points, into reaction mixture containing catalyst so as to continue alkylation,
   removing a hydrocarbon phase from an upper portion of said zone and elevating same to a settling zone above said reaction zone,
   removing catalyst from a lower portion of said reaction zone and elevating same along with said removed hydrocarbon phase to said settling zone,
   separately recovering a hydrocarbon phase and a catalyst phase from said settling zone,
   and returning said recovered catalyst phase to said reaction zone for further use in the process.

3. The process of claim 2 wherein the flow of catalyst in the system is caused solely by energy imparted to it by flowing hydrocarbons and temperature and density differences in said settling zone and reaction zone.

4. A process for alkylation of (a) an alkylatable material with (b) an alkylating agent in the presence of an alkylation catalyst at a high ratio of (a) to (b) which comprises:
   forming a reaction mixture comprising alkylatable material, alkylating agent and alkylation catalyst in an elongated reaction zone and subjecting said reaction mixture to alkylation conditions within said zone to alkylate said alkylatable material,
   separating out a substantially catalyst free hydrocarbon phase from the reaction mixture within said zone at a plurality of spaced points,
   introducing alkylating agent into the separated hydrocarbon phase at each of said spaced points and then mixing the separated hydrocarbon phase and added alkylating agent with reaction mixture containing catalyst immediately above the separated hydrocarbon phase so as to effect further alkylation,
   and recovering from said zone the hydrocarbon phase and a catalyst phase for further processing as desired.

5. A process for alkylation in the presence of an acid catalyst wherein the alkylation reaction is carried out in at least two contacting steps followed by separation of a hydrocarbon phase and an acid-containing phase and the addition of alkylating agent to the separated hydrocarbon phase and the further contacting of the separated hydrocarbon phase with added alkylating agent, Step I comprising:
(a) mixing together all of the alkylatable hydrocarbon with up to 50 percent of the alkylating agent to be used to form a hydrocarbon mixture having a high ratio of alkylatable material to alkylating agent,
(b) contacting said hydrocarbon mixture obtained in (a) with acid catalyst under alkylation conditions to effect alkylation of at least a portion of the alkylatable material,
(c) separating out both a substantially catalyst free hydrocarbon phase comprising alkylate, alkylatable material and alkylating agent and a separate catalyst phase from said contacting in (b), Step II and each succeeding step comprising:
(d) adding an additional amount of alkylating agent not exceeding the amount added in (a) to the hydrocarbon phase separated in (c),
(e) dispersing the resulting hydrocarbon mixture obtained in (d) with acid catalyst under alkylating conditions to effect further alkylation,
(f) separating a hydrocarbon phase comprising alkylate, alkylatable material and alkylating agent and an acid phase from the contacting in (e), and recovering alkylate from the last step of the process as product.

6. An apparatus for alkylation comprising, in combination,
a vertically extending elongated reaction chamber,
a settling chamber in open communication with said reaction chamber,
feed inlet means for introducing reactants into a lower portion of said reaction chamber,
catalyst inlet means for introducing catalyst into said reaction chamber,
outlet means in an upper portion of said settling chamber for removing a separated hydrocarbon phase therefrom,
outlet means in a lower portion of said settling chamber connected to said reaction chamber for removing catalyst therefrom and returning same to said reaction chamber,
and a plurality of spaced olefin feed inlet distributors in said reaction chamber, each of said inlet distributors comprising (1) means to provide a quiescent section in said reaction chamber so that a hydrocarbon phase can separate out of the reaction mixture being passed therethrough, (2) means to provide olefin feed introduction into said reaction chamber at each of said distributors into the separated hydrocarbon phase and (3) means to provide dispersion of separated hydrocarbon phase and added olefin into the reaction mixture above each of said distributors.

7. An apparatus for alkylation comprising in combination, a vertically extending elongated reaction chamber; a settling chamber in open communication with said reaction chamber; feed inlet means for introducing reactants into a lower portion of said reaction chamber; catalyst inlet means for introducing catalyst into said reaction chamber; outlet means in an upper portion of said settling chamber for removing a separated hydrocarbon phase therefrom; outlet means in a lower portion of said settling chamber connected to said reaction chamber for removing catalyst therefrom and returning same to said reaction chamber; and a plurality of spaced olefin feed inlet distributors in said reaction chamber, each of said inlet distributors comprising:
(a) a first horizontal plate member extending across a substantial of said reaction chamber connected to one side wall of said reaction chamber, said plate member being provided with perforations at the end away from the connected end;
(b) a second horizontal plate member extending part way across said chamber below said first plate member, said second plate member being connected to the perforated end of said first plate member, thus providing a confined space below said first plate member for introducing olefin into a separated hydrocarbon phase, said feed inlet distributors being alternately connected to opposite side walls of said chamber so as to provide a tortuous path for the reaction mixture passing upwardly through the reaction chamber, and
(c) a feed inlet conduit extending through the wall of said chamber into the confined space between said first and said second plate members.

8. An apparatus for alkylation comprising, in combination, a vertically extending elongated reaction chamber; a settling chamber in open communication with said reaction chamber; feed inlet means for introducing reactants into a lower portion of said reaction chamber; catalyst inlet means for introducing catalyst into said reaction chamber; outlet means in an upper portion of said settling chamber for removing a separated hydrocarbon phase therefrom; outlet means in a lower portion of said settling chamber connected to said reaction chamber for removing catalyst therefrom and returning same to said reaction chamber; and a plurality of spaced olefin feed inlet distributors in said reaction chamber, each of said inlet distributors comprising:
(a) a first horizontal extending perforated plate member extending across said chamber connected to the side walls of said chamber, said plate being provided with a domed section extending upwardly and which is closed at the top to provide a confined section under said plate for introduction of olefin feed;
(b) a downwardly extending downcomer member at one end of said plate member providing a flow path for reaction mixture between adjacent feed inlet distributors, said downcomers being on alternate sides of said chamber so as to provide a tortuous path for reaction mixture passing through said reaction chamber;
(c) a second horizontal plate member extending part way across said chamber spaced below and parallel to said first plate member, one end of said second plate member being connected to said downcomer and the other end having a depending leg and being spaced away from the side wall opposite the downcomer, said second plate member being further provided with a domed portion extending upwardly within the dome on said first plate member, said lower domed portion being provided with an opening to provide introduction of olefin and separated hydrocarbon into the confined space between said two plate members;
(d) and a feed inlet conduit extending in from a side wall of said chamber and upwardly into the chimney of said second plate member adapted to introduce olefin into a hydrocarbon phase and into the space between the domes and then through said perforations into the reaction mixture above said first plate member.

9. An apparatus for alkylation comprising, in combination, a vertically extending elongated reaction chamber; a settling chamber in open communication with said reaction chamber; feed inlet means for introducing reactants into a lower portion of said reaction chamber; catalyst inlet means for introducing catalyst into said reaction chamber; outlet means in an upper portion of said settling chamber for removing a separated hydrocarbon phase therefrom; outlet means in a lower portion of said settling chamber connected to said reaction chamber for removing catalyst therefrom and returning same to said reaction chamber; and a plurality of spaced olefin feed inlet distributors comprising:

(a) a perforated horizontal plate member connected to one side wall of said chamber extending across a substantial portion of said chamber;

(b) a vertical plate member connected to the end of said perforated plate opposite said connected end so as to provide a downcomer space opposite the connected end of said perforated plate and a confined space beneath said perforated plate member to allow separation of a hydrocarbon phase from the reaction mixture passing upwardly through the chamber;

(c) and a feed inlet conduit extending through a side wall of said chamber and into the space below said perforated plate adapted to introduce olefin into the separated hydrocarbon phase below said perforated plate.

References Cited by the Examiner

UNITED STATES PATENTS

| | | |
|---|---|---|
| 2,386,681 | 10/1945 | Hadden. |
| 2,453,837 | 11/1948 | Fisher et al. _____ 23—285 |
| 2,459,636 | 1/1949 | Fenney _____ 260—683.4 |
| 2,751,425 | 6/1956 | Rupp _____ 260—683.59 |
| 3,080,438 | 3/1963 | Sailors _____ 260—683.48 |
| 3,091,586 | 5/1963 | Pappas et al. _____ 196—46 X |
| 3,108,048 | 10/1963 | McDonald _____ 260—683.48 X |
| 3,179,712 | 5/1965 | Carson _____ 260—683.48 |

DELBERT E. GANTZ, *Primary Examiner.*

ALPHONSO D. SULLIVAN, *Examiner.*

CURTIS R. DAVIS, R. H. SHUBERT,
*Assistant Examiners.*